(12) United States Patent
Heuberger et al.

(10) Patent No.: US 10,760,688 B2
(45) Date of Patent: Sep. 1, 2020

(54) ROTARY LEADTHROUGH FOR A VEHICLE

(71) Applicants: Schaeffler Technologies AG & Co. KG, Herzogenaurach (DE); GAPI Technische Produkte GmbH, Rösrath (DE)

(72) Inventors: Robert Heuberger, Schweinfurt (DE); Horst Brehm, Bischberg (DE); Sebastian Niederle, Geldersheim (DE); Marc-André Schäfer, Üchtelhausen (DE); Andre Hofmann, Schonungen/Abersfeld (DE); Andreas Flint, Köln (DE)

(73) Assignees: Schaeffler Technologies AG & Co. KG, Herzogenaurach (DE); GAPI Technische Produkte GmbH, Rösrath (DE)

( * ) Notice: Subject to any disclaimer, the term of this patent is extended or adjusted under 35 U.S.C. 154(b) by 13 days.

(21) Appl. No.: 15/741,798

(22) PCT Filed: Jul. 1, 2016

(86) PCT No.: PCT/DE2016/200304
§ 371 (c)(1),
(2) Date: Jan. 4, 2018

(87) PCT Pub. No.: WO2017/005261
PCT Pub. Date: Jan. 12, 2017

(65) Prior Publication Data
US 2018/0195619 A1 Jul. 12, 2018

(30) Foreign Application Priority Data

Jul. 7, 2015 (DE) .......................... 10 2015 212 641

(51) Int. Cl.
*F16J 15/34* (2006.01)

(52) U.S. Cl.
CPC ......... *F16J 15/3448* (2013.01); *F16J 15/342* (2013.01); *F16J 15/3404* (2013.01)

(58) Field of Classification Search
CPC ........ F16J 15/34; F16J 15/3404; F16J 15/342; F16J 15/3436; F16J 15/3448
See application file for complete search history.

(56) References Cited

U.S. PATENT DOCUMENTS

| 9,618,125 B2* | 4/2017 | Kolakov | ................. F16J 15/40 |
| 2012/0139186 A1* | 6/2012 | Suefuji | ..................... F16J 15/36 277/377 |

FOREIGN PATENT DOCUMENTS

| CN | 1653272 A | 8/2005 |
| CN | 201696282 U | 1/2011 |

(Continued)

*Primary Examiner* — Gilbert Y Lee
(74) *Attorney, Agent, or Firm* — Kevin Parks

(57) ABSTRACT

Rotary joints are disclosed, such as for supplying fluid to a pressure chamber that is disposed between a rotatable component and a stationary component. The rotary joint may include a seal carrier having at least one channel for a fluid connection to the pressure chamber. At least two axially spaced apart sealing rings may be disposed on the seal carrier for a static sealing of the at least one channel. At least one sealing element may be non-rotatably disposed on the seal carrier and configured to form an axial and a radial seal of the pressure chamber. The at least one sealing element may be configured to bear on a ring element that is non-rotatably connected to the rotatable component when pressure is built up in the pressure chamber and the at least one sealing element may have means for reducing the axial pressure exerted on the ring element.

17 Claims, 2 Drawing Sheets

(56) References Cited

FOREIGN PATENT DOCUMENTS

| | | |
|---|---:|---|
| CN | 202901285 U | 4/2013 |
| CN | 103912685 A | 7/2014 |
| CN | 104685273 A | 6/2015 |
| DE | 3604137 A1 | 8/1987 |
| DE | 102012222339 A1 | 7/2013 |
| EP | 1113176 A2 | 7/2001 |
| EP | 2816235 A1 | 12/2014 |
| GB | 560280 A | 3/1944 |
| GB | 817396 A | 7/1959 |
| WO | 2014142265 A1 | 9/2014 |

\* cited by examiner

ROTARY LEADTHROUGH FOR A VEHICLE

CROSS-REFERENCE TO RELATED APPLICATIONS

This application is the U.S. National Phase of PCT Appln. No. PCT/DE2016/200304 filed Jul. 1, 2016, which claims priority to DE 102015212641.2 filed Jul. 7, 2015, the entire disclosures of which are incorporated by reference herein.

TECHNICAL FIELD

The disclosure relates to a rotary joint for supplying fluid to a pressure chamber, which is disposed between a rotatable component and a stationary fixed component of a vehicle. A seal carrier has at least one channel for a fluid connection to the pressure chamber and at least two axially spaced apart sealing rings are disposed on the seal carrier, for a static sealing of the at least one channel. AT least one sealing element is non-rotatably disposed on the seal carrier for an axial as well as radial sealing of the pressure chamber.

BACKGROUND

Rotary joints are used in particular in trucks and tractors that travel over different surfaces, in order to adapt the tire pressure to the road surface characteristics. It is advantageous in fields or on unpaved streets when a tire pressure is low, in order to increase the traction of the vehicle. On paved streets a higher tire pressure is preferred, in order reduce tire wear and fuel consumption. The rotary joint makes it possible to vary the tire pressure by increasing or decreasing the air pressure in a pressure chamber.

DE 10 2012 222 339 A1 discloses a fluid rotary joint for sealing a fluid pressure chamber between a rotatable shaft and a shaft receiver. The fluid rotary joint comprises a seal carrier and a fitted body, wherein the seal carrier is non-rotatably connected in a fluid-tight manner to the shaft or the receiver, and the fitted body bears in a fluid-tight manner on receiver or the shaft. The fitted body and the seal carrier are disposed at least in sections at a spacing to one another, in order to form a fluid-tight space between them. Furthermore, two sealing rings, spaced axially apart from one another, are provided, each of which bear in a sealing manner with a bearing surface against the seal carrier and with a bearing surface against the fitted body, in order to seal the fluid pressure chamber to the exterior at both ends, which can each rotate, preferably independently of one another, in relation to the seal carrier and/or the fitted body. The seal carrier and the fitted body collectively form two receiving grooves for the sealing rings, axially spaced apart from one another, wherein the receiving grooves are open toward the fluid pressure chamber, and each comprise at least one retention projection, which secures the sealing ring disposed in the receiving groove, at least in sections, against a radial displacement from the groove toward the fluid pressure chamber.

In other words, the respective sealing ring is provided for both a radial and an axial seal. With a pressure buildup in the pressure chamber, the respective sealing ring bears axially on a sealing surface. The axial pressure exerted by the respective sealing ring against the sealing surface is relatively high, such that due to an increased wear as well as an increased thermal load, the service life of the respective seal is significantly reduced. With very high pressures, the respective seal may even fail immediately.

SUMMARY

One object of the disclosure is to further develop a rotary joint, and in particular to increase the sealing effect and the service life thereof.

In accordance with the disclosure, the at least one sealing element bears axially against a ring element non-rotatably connected to the rotatable component when pressure is built up in the pressure chamber, wherein the at least one sealing element has means for reducing the axial pressure to the ring element. The means for reducing the axial pressure of the at least one sealing element are integrated in the sealing element, thus forming an integral unit. With at least one sealing element, it is understood that the rotary joint has either one sealing element or two sealing elements. The assembly having two sealing elements forms a symmetrical construction of the rotary joint. Such a symmetrical construction of the rotary joint is accompanied by the respective sealing element bearing on a respective ring element. In particular, the rotary joint serves to connect a tire of a vehicle to a pressurized air source.

Depending on whether the field of application for the rotary joint is in a wheel bearing assembly of an agricultural machine or a truck, either the inner ring, and the shaft connected thereto, can rotate, and the outer ring is secured in a stationary manner to a non-rotating component, or the outer ring can rotate, and the inner ring is secured in a stationary manner. Both fields of application are conceivable for the rotary joint according to the disclosure.

According to one embodiment, a first end surface of the at least one sealing element disposed on the ring element is larger than a second end surface of the at least one sealing element bordering on the pressure chamber. This special design of the at least one sealing element serves in particular as a means for reducing the axial pressure. As a result of the size difference between the two end surfaces, the pressure acting on the two end surfaces due to the pressure in the pressure chamber is distributed on the larger first end surface, wherein the amount of axial force acting on the first end surface is exactly as great as the amount of axial force acting on the second end surface. As a result, the wear to the first end surface is reduced, as well as the thermal load between the second end surface and the rotating ring element.

The first end surface of the at least one sealing element is preferably at least 1.05 times as large, but no more than 5 times as large, as the second end surface of the at least one sealing element. Consequently, the two end surfaces may exhibit a ratio of 1:1.05 to 1:5, depending on the pressure to be expected in the pressure chamber.

In accordance with one embodiment, the at least one sealing element has at least one relief bore, which forms a fluid connection to a counter-pressure chamber. This special design of the at least one sealing element serves in particular as a means for reducing the axial pressure. At the same time, this also provides for a quick placement of the first end surface against the ring element. The at least one relief bore is preferably axial thereby. When pressure is built up in the pressure chamber, the pressurized air escapes the pressure chamber through the relief bore, into the counter-pressure chamber, by means of which a counter-pressure builds up on the pressure surface of the at least one sealing element disposed inside the counter-pressure chamber. This counter-pressure acts against the pressure acting on the second end surface bordering on the pressure chamber, and reduces thereby a pressure exerted by the at least one sealing element on the rotating ring element.

In one embodiment, the at least one sealing element has numerous relief bores, which form a fluid connection with a counter-pressure chamber. Numerous relief bores having small diameters facilitate a slow buildup of the counter-pressure in the counter-pressure chamber. Consequently, a slowed reduction of the axial pressure exerted by the at least one sealing element on the ring element takes place.

Included in the technical teachings of the disclosure, is that the at least one sealing element has an axial region having a circumferential sealing lug, which bears radially on the seal carrier. Because the at least one sealing element is non-rotatably disposed on the seal carrier, the sealing surface between the at least one sealing element and the seal carrier is subjected to a lower load than the sealing surface between the at least one sealing element and the ring element, which also forms a sliding surface. It is thus advantageous to increase the pressure exerted at this point, in order to thus also increase the reliability of the sealing effect. In particular, this takes place as a result of the formation of the circumferential lug on at least one sealing element, which has a particularly small bearing surface on the seal carrier, and is thus subjected to a high pressure.

The region running axially is preferably flexible in the radial direction. In other words, a pressure buildup in the pressure chamber can act more quickly and easily on the axial region, and thus on the sealing effect on the seal carrier. The axial region serves as a lever arm for absorbing a radial force from the pressure chamber.

The axial region may be at least 0.3 times, but no more than 0.7 times, as large as the overall axial size of the at least one sealing element. A larger axial region results in a larger lever arm, and thus the maximum radial force that can be absorbed.

In particular, the circumferential sealing lug is disposed such that it is substantially static in relation to the sealing mount. The sealing lug thus exhibits substantially no movement in relation to the seal carrier. Exceptions thereto are slight compensating movements and small axial displacements, which allow for a readjustment of the position of the sealing element when it exhibits signs of wear.

The axial region is furthermore preferably larger than the second end surface of the at least one sealing element. In other words, the axial region has a relatively large wall thickness, and is thus formed in the manner of a web.

The at least one sealing element may be formed from a polymer substance. In particular, a polytetrafluoroethylene substance is suitable for this.

BRIEF DESCRIPTION OF THE DRAWINGS

Further measures improving the disclosure shall be explained in greater detail below, in conjunction with the description of exemplary embodiments of the disclosure, based on the Figures.

DETAILED DESCRIPTION

Figure 1:
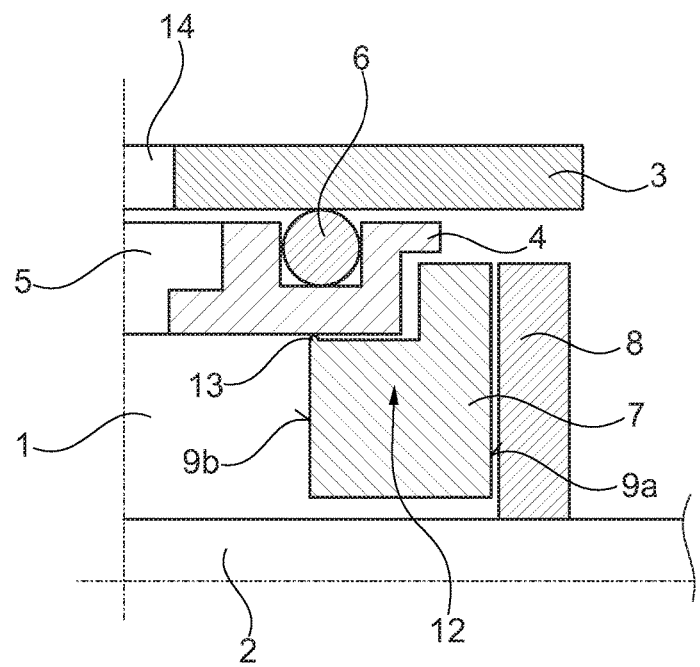
FIG. 1 shows a portion of a schematic sectional view for illustrating the construction of a rotary joint according to the disclosure, in accordance with a first embodiment.

FIGS. 1 to 7 show a rotary joint according to the disclosure, for supplying pressurized air to a pressure chamber 1, which is disposed between a rotating component 2 and a stationary component 3 of a—not shown here—vehicle. The rotary joint comprises a seal carrier 4 with a channel 5 for a fluid connection to the pressure chamber 1. The channel 5 is also connected to a further channel 14, which leads to a—not shown here—pressurized air source. By feeding pressurized air into the pressure chamber 1, a tire pressure of a—not shown here—tire of a vehicle is adjusted in a variable manner, and in particular, coordinated to the driving surface. Furthermore, two spaced apart sealing rings are disposed on the seal carrier 4 for a static sealing of the channel 5, wherein, due to the partial sectional view, only one of the two sealing rings 6 is illustrated. The rotary joint has a symmetrical design.

Moreover, two sealing elements 7 are disposed on the seal carrier 4, for both an axial and a radial sealing of the pressure chamber 1, wherein, due to the partial sectional view, only one of the two sealing elements 7 is illustrated. When the pressure chamber 1 is subjected to a pressure, the respective sealing element 7 bears axially on a respective ring element 8 that is non-rotatably connected to the rotatable component 2. Furthermore, the at least one sealing element 7 has an axial region 12 with a circumferential sealing lug 13, which bears radially on the sealing mount 4. In order to reduce wear to the sealing element 7, and to thus increase the service life of the rotary joint, means for reducing the axial pressure exerted on the ring element 8 are formed on the sealing element 7.

According to FIG. 1, a first end surface 9a of the sealing element 7 disposed on the ring element 8 is larger than a second end surface 9b of the sealing element 7 bordering on the pressure chamber 1. This special design of the sealing element 7 depicts a means for reducing the axial pressure exerted on the ring element 8. In one embodiment, the first end surface 9a of the sealing element 7 is 1.4 times are large as the second end surface 9b of the sealing element 7. The second end surface 9b of the sealing element 7 thus serves as a contact surface for the pressurized air in the pressure chamber 1, wherein the force acting on the end surface 9b is evenly distributed on the larger end surface 9a, by means of which a pressure exerted by the sealing element 7 on the ring element 8 decreases.

Figure 2:
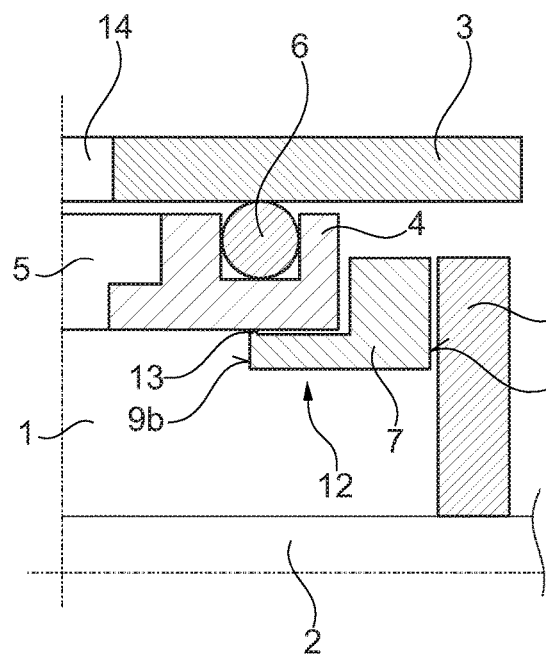
FIG. 2 shows a portion of a schematic sectional view for illustrating the construction of a rotary joint according to the disclosure, in accordance with a second embodiment.

According to the embodiment of FIG. 2, the first end surface 9a of the sealing element 7 is five times as large as the second end surface 9b of the sealing element 7. Furthermore, the axial region 12 is radially flexible. The axial region 12 is half as large as the overall axial size of the sealing element 7. Moreover, the axial region 12 is larger than the second end surface 9b of the sealing element 7.

Figure 3:
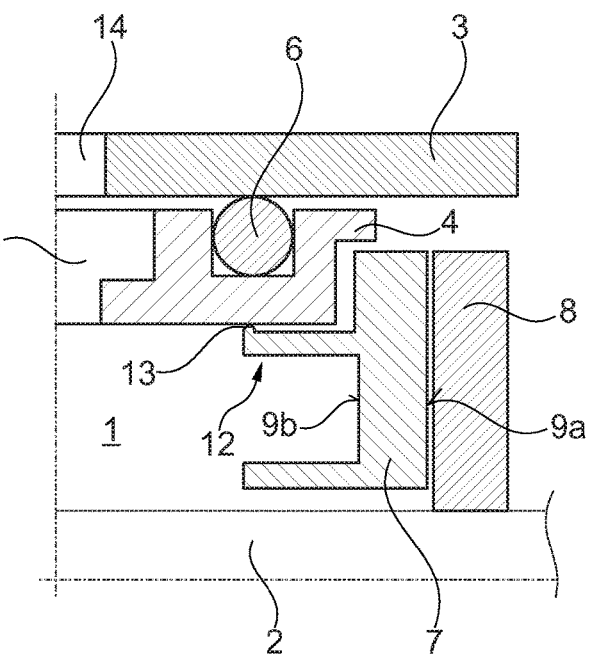
FIG. 3 shows a portion of a schematic sectional view for illustrating the construction of a rotary joint according to the disclosure, in accordance with a third embodiment.

FIG. 3 shows an embodiment of the sealing element 7 that has a first end surface 9a that is twice as large as the second end surface 9b of the sealing element 7, wherein the axial region 12 is radially flexible.

Figure 4:
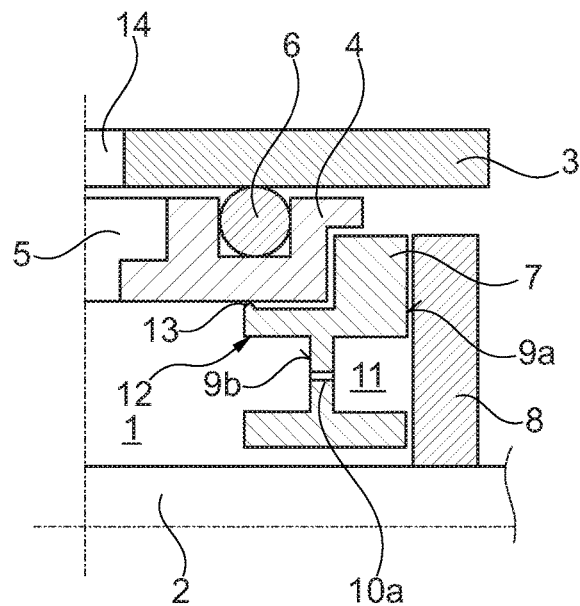
FIG. 4 shows a portion of a schematic sectional view for illustrating the construction of a rotary joint according to the disclosure, in accordance with a fourth embodiment.

According to the embodiment of FIG. 4, the sealing element 7 has a relief bore 10a, which forms a fluid connection between the pressure chamber 1 and a counter-pressure chamber 11. This special design of the sealing element 7 also depicts a means for reducing the axial pressure exerted on the ring element 8. Furthermore, the axial region 12 is radially flexible, and the first end surface 9a is twice as large as the second end surface 9b of the sealing element 7.

Figure 5:
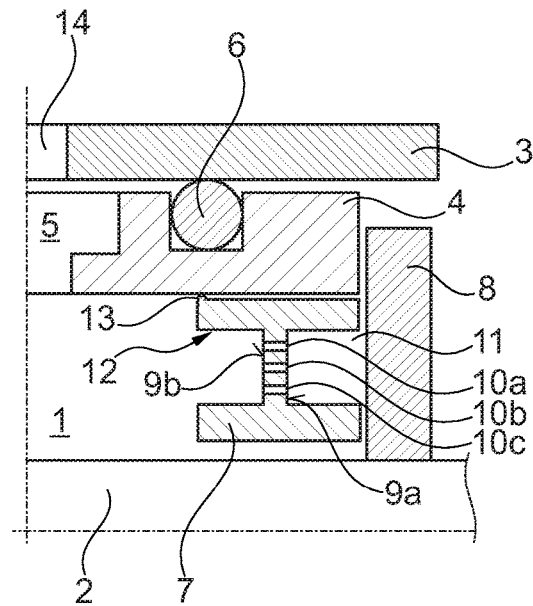
FIG. 5 shows a portion of a schematic sectional view for illustrating the construction of a rotary joint according to the disclosure, in accordance with a fifth embodiment.

According to the embodiment of FIG. 5, the sealing element 7 has numerous relief bores 10a, 10b, 10c, which form a fluid connection between the pressure chamber 1 and a counter-pressure chamber 11. The only means for reducing the axial pressure exerted by the sealing element 7 on the ring element 8 are the relief bores 10a-10c. Furthermore, the axial region 12 is radially flexible.

Figure 6:
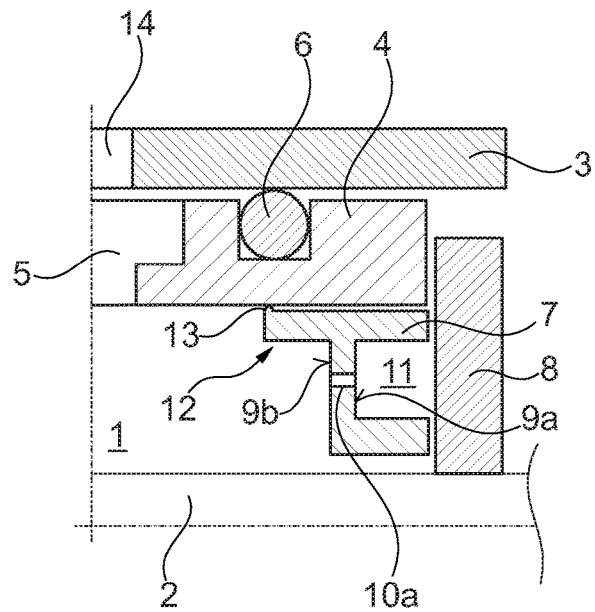
FIG. 6 shows a portion of a schematic sectional view for illustrating the construction of a rotary joint according to the disclosure, in accordance with a sixth embodiment.
Figure 7:
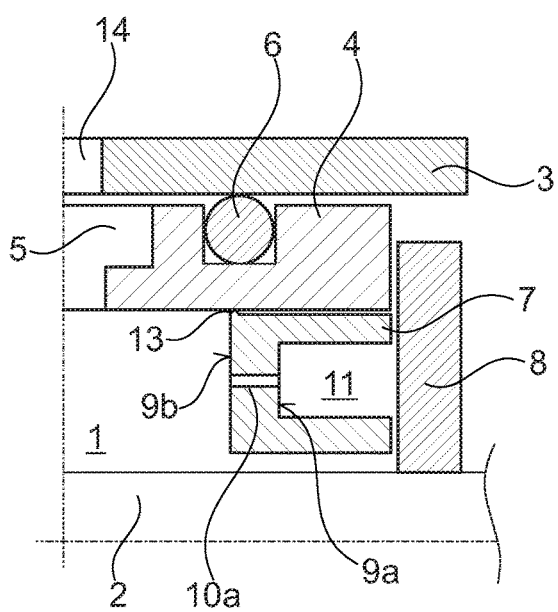
FIG. 7 shows a portion of a schematic sectional view for illustrating the construction of a rotary joint according to the disclosure, in accordance with a seventh embodiment.

FIGS. 6 and 7 depict a simplified embodiments of the sealing element 7 from the embodiment of FIG. 5. The sealing element 7 according to FIGS. 6 and 7 has only one relief bore 10a thereby, which forms a fluid connection between the pressure chamber 1 and the counter-pressure chamber 11. The counter-pressure chamber 11 according to FIG. 7 also has a larger volume than the counter-pressure chamber 11 according to FIGS. 5 and 6.

LIST OF REFERENCE SYMBOLS 1 pressure chamber
2 rotatable component
3 stationary component
4 seal carrier
5 channel
6 sealing ring
7 sealing element
8 ring element
9a, 9b end surface
10a-10c relief bore
11 counter-pressure chamber
12 axial region
13 sealing lug
14 channel

The invention claimed is:

1. A rotary joint for supplying fluid to a pressure chamber that is disposed between a rotatable component and a stationary component of a vehicle, the rotary joint comprising:
a seal carrier having at least one channel for a fluid connection to the pressure chamber, wherein at least two axially spaced apart sealing rings are disposed on the seal carrier for a static sealing of the at least one channel;
at least one sealing element non-rotatably disposed on the seal carrier and configured to form an axial seal with a ring element that is non-rotatably connected to the rotatable component and a radial seal with the seal carrier to at least partially seal the pressure chamber; and
wherein the at least one sealing element is configured to bear on the ring element when pressure is built up in the pressure chamber and the at least one sealing element has means for reducing an axial pressure exerted on the ring element;
wherein the at least one sealing element has an axial region with a circumferential sealing lug that bears radially outwardly directly on the seal carrier to at least partially seal the pressure chamber; and
wherein a first axial length of the circumferential sealing lug is less than half of a second axial length of the at least one sealing element.

2. The rotary joint according to claim 1, wherein a first end surface of the at least one sealing element is configured to bear on the ring element and is larger than a second end surface of the at least one sealing element that borders on the pressure chamber, thereby reducing the axial pressure exerted by the at least one sealing element on the ring element.

3. The rotary joint according to claim 2, wherein the first end surface of the at least one sealing element is at least 1.05 times, but no more than 5 times, as large as the second end surface of the at least one sealing element.

4. The rotary joint according to claim 1, wherein the at least one sealing element has at least one relief bore, which forms a fluid connection between the pressure chamber and a counter-pressure chamber, thereby reducing the axial pressure exerted by the at least one sealing element on the ring element.

5. The rotary joint according to claim 1, wherein the axial region is radially flexible and arranged to be radially deflected by the pressure in the pressure chamber such that the circumferential sealing lug contacts the seal carrier.

6. The rotary joint according to claim 1, wherein the axial region is at least 0.3 times, but no more than 0.7 times, as large as an overall axial size of the at least one sealing element.

7. The rotary joint according to claim 1, wherein the circumferential sealing lug is disposed such that it is substantially static in relation to the seal carrier.

8. The rotary joint according to claim 1, wherein a first end surface of the at least one sealing element is configured to bear on the ring element and is larger than a second end surface of the at least one sealing element that borders on the pressure chamber; and
the axial region is larger than the second end surface of the at least one sealing element.

9. The rotary joint according to claim 1, wherein the at least one sealing element is made of a polymer substance.

10. A rotary joint for supplying fluid to a pressure chamber that is disposed between a rotatable component and a stationary component, the rotary joint comprising:
a seal carrier having a channel for a fluid connection to the pressure chamber;
a sealing element non-rotatably disposed on the seal carrier and configured to axially and a radially seal the pressure chamber; and
a ring element that is non-rotatably connected to the rotatable component;
wherein a first end surface of the sealing element is configured to bear on the ring element when pressure is built up in the pressure chamber and the first end surface is larger than a second end surface of the sealing element that is opposite the first end surface and borders the pressure chamber, the first end surface configured to reduce an axial pressure exerted on the ring element; and
wherein the sealing element has an axial region with a circumferential sealing lug that bears radially directly on the seal carrier; and
wherein a first axial length of the circumferential sealing lug is less than half of a second axial length of the sealing element.

11. The rotary joint according to claim 10, wherein the first end surface of the sealing element is at least 1.05 times, but no more than 5 times, as large as the second end surface of the sealing element.

12. The rotary joint according to claim 10, wherein the sealing element has at least one relief bore, which forms a fluid connection between the pressure chamber and a counter-pressure chamber.

13. The rotary joint according to claim 10, wherein the axial region is radially flexible.

14. The rotary joint according to claim 10, wherein the axial region is at least 0.3 times, but no more than 0.7 times, as large as an overall axial size of the sealing element.

15. The rotary joint according to claim 10, wherein the circumferential sealing lug is disposed such that it is substantially static in relation to the seal carrier.

16. The rotary joint according to claim 10, wherein the axial region is larger than the second end surface of the sealing element.

17. The rotary joint according to claim 10, wherein the sealing element is made of a polymer substance.

* * * * *